United States Patent [19]

Hayden

[11] Patent Number: 4,887,552
[45] Date of Patent: Dec. 19, 1989

[54] ELECTRICALLY LIGHTED LEASH

[76] Inventor: James T. Hayden, 3154 Exon St., Cincinnati, Ohio 45241

[21] Appl. No.: 253,669

[22] Filed: Oct. 5, 1988

[51] Int. Cl.⁴ ............................................... A01K 1/00
[52] U.S. Cl. .................................................... 119/109
[58] Field of Search ..................... 119/96, 106, 109; 362/236, 237, 806

[56] References Cited

U.S. PATENT DOCUMENTS

| | | | |
|---|---|---|---|
| 2,721,257 | 10/1955 | Knox | 119/106 |
| 3,500,036 | 3/1970 | Szentveri | 362/806 X |
| 3,871,336 | 3/1975 | Bergman | 119/106 |
| 4,019,463 | 4/1977 | Kitchen | 119/109 |
| 4,173,201 | 11/1979 | Chao et al. | 119/106 |
| 4,271,458 | 6/1981 | George, Jr. | 362/236 |
| 4,384,548 | 5/1983 | Cohn | 119/109 |
| 4,513,692 | 4/1985 | Kuhnsman et al. | 119/109 |

FOREIGN PATENT DOCUMENTS

| | | | |
|---|---|---|---|
| 2578388 | 9/1986 | France | 119/106 |
| 2579417 | 10/1986 | France | 119/106 |
| 2188524 | 4/1986 | United Kingdom | 119/106 |

*Primary Examiner*—Robert Peshock
*Assistant Examiner*—R. Thomas Price
*Attorney, Agent, or Firm*—Wood, Herron & Evans

[57] ABSTRACT

A leash for a pet, comprising a series of closely spaced electric lights which are disposed longitudinally in a central axial passage in a hollow, flexible transparent tube. The tube is provided with thinner longitudinal strengthening ribs or flanges along opposite sides of the center portion in which the lights are housed, and has an integral hand loop at one end and an integral choker collar at the other.

6 Claims, 1 Drawing Sheet

ELECTRICALLY LIGHTED LEASH

FIELD OF THE INVENTION

This invention relates to a leash for use when walking a pet, and more particularly to a choker type leash which is electrically illuminated along its length.

THE PRIOR ART

Various pet collars illuminated by self-contained lights are known. Chao U.S. Pat. No. 4,173,201 shows a pet collar having "studded" lights which project outwardly from a collar. Each light has a dome which is elongated and protrudes outwardly so as to be visible through long fur. The lights are connected in parallel, and are operated by a battery and a switch on the collar.

An illuminated leash is shown in Kuhnsman U.S. Pat. No. 4,513,692. The leash is in the form of a flexible hollow tube which is illuminated by a bundle of optical fibers that extend inside the tube. Knox U.S. Pat. No. 2,721,257 shows another form of dog collar, having just a single light. Bergman U.S. Pat. No. 3,871,336 shows a reflective dog collar which is not illuminated but which utilizes reflective dots of different colors encapsulated in plastic.

Cohn U.S. Pat. No. 4,384,548 shows a pet collar using "retro-reflective" threads in the leash. The threads are said to reflect incident light directly back toward the source.

BRIEF DESCRIPTION OF THE INVENTION

In accordance with this invention a leash is provided which is illuminated along its length by a series of closely spaced internal lights. The lights provide a nearly continuous "line" of light between the owner and the pet, which improves visibility from a distance, for example by an oncoming motorist, and thereby contributes to safety. The leash comprises a transparent hollow flexible tube having a central passage which extends through its entire length. On each side of the central passage, thinner unitary flanges or ribs extend outwardly along the length of the tube. These ribs have several functions: they provide a wider surface area to bear in contact with the animal's neck and the owner's hand, to prevent choking and constriction; they strengthen the otherwise weaker center portion which is relatively thin walled for visibility of the lights with it; they resist twisting and tangling; and they provide a convenient means to form a hand loop and "choker" collar, to be described. A string of small electric lights is disposed within the central passage, the lights being mounted in parallel between two insulated wires which extend down the passage.

At one end the leash is looped back onto itself to provide a fixed hand loop, and the lights preferably continue in the passage and around the loop, to form a string of lights around the owner's hand. The other end of the leash has an eye at the end, through which the leash passes to form a choker-type collar loop. The lights preferably continue around this loop also, to form a circle of lights around the pet's neck. Thus the string of lights preferably extends around the pet's neck, up to and around the owner's hand. A small rechargeable battery is preferably mounted on the leash adjacent to the hand loop, with a switch for controlling operation of the lights.

DETAILED DESCRIPTION

Figure 3:
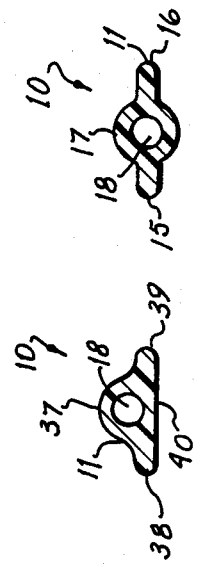
FIG. 3 is a cross section taken on line 3—3 of FIG. 1 and shows the preferred cross-sectional shape of the leash.

The leash designated generally at 10 in the drawing includes a, tube 11 of flexible transparent material which is looped back onto itself to form a hand loop 12 at one end, and a sliding "choker" type collar 13 at the other end. The flexible tube, which may for example be of a plastic composition incorporating nylon for strength, has a cross-sectional shape the preferred form of which is shown in FIG. 3. This configuration provides a relatively strong, wide but thin cross-sectional shape. A round, generally cylindrical, center portion 17 has an interior passage 18 which runs the length of the leash, and the lights to be described are disposed in this passage. The wall thickness of center portion 17 around passage 18 is relatively thin, except at the ribs, e.g., about 1/16"-⅛", so that the lights will be clearly visible through the plastic. The leash may be in the range of ½" to 1" wide, measured across the ribs. It is contemplated that the tube 11 may be extruded, with the ribs formed integrally with the center portion. Alternatively, however, a transparent center portion 17 could be extruded without ribs and joined to separately formed ribs or "wings" 15 and 16 of different material. The material should be transparent, at least in the center, so that the lights can be seen from either direction.

A string of lights, indicated at 26, is disposed axially within the central passage 18 and preferably runs the length of the tube. These lights may conveniently be of the type "line light" sold commercially for illuminating trucks and other vehicles, and comprise a series of miniature 9 volt bulbs connected in parallel between a pair of insulated leads. The lights are preferably uniformly spaced, about one to six inches apart along passage 18. If spaced closer the current drain may be too heavy; if farther apart, the safety factor is reduced. The string of lights can simply be slid or pushed into passage 18 from one end; they need not be secured except at the end, preferably at a battery, to be described.

Figure 1:
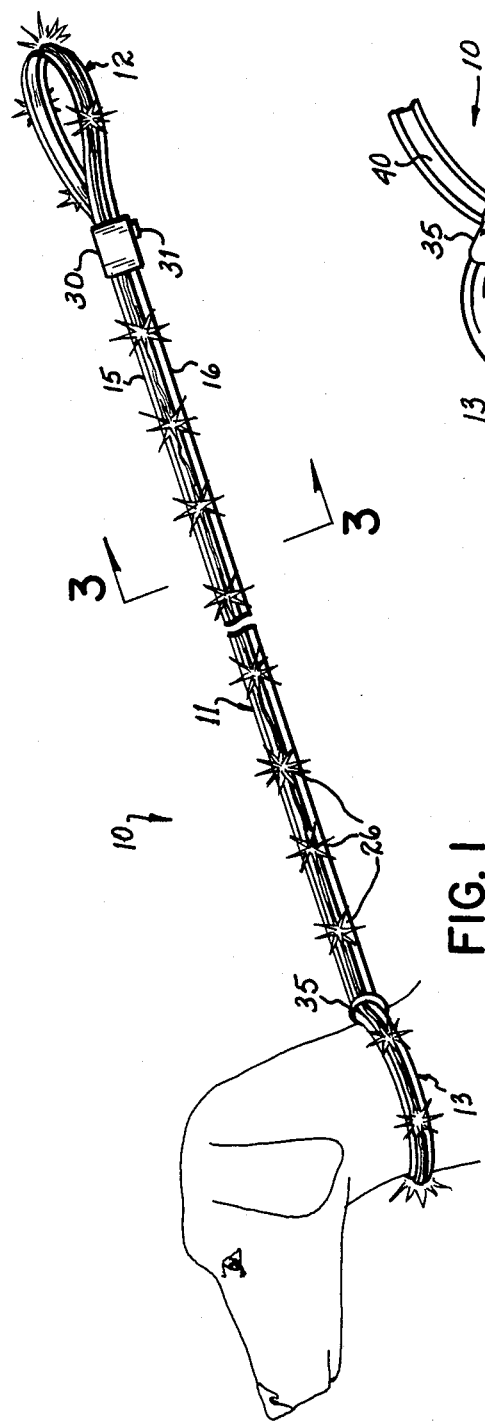
FIG. 1 is a diagrammatic view of a leash in accordance with a preferred form of the invention, in use around the neck of a dog.
Figure 2:
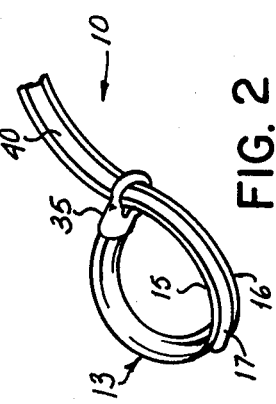
FIG. 2 is a fragmentary perspective of the choker collar end of the leash.

The lights are energized by a battery indicated generally at 30 in FIG. 1, which may be associated with a switch 31. The battery is preferably mounted to the leash adjacent the hand loop 12, at the point where the hand loop material is secured back onto the main part of the leash. The battery is desirably of a rechargeable type. The ribs facilitate joining the end of the hand loop to the standing part of the leash; for example, the overlying ribs can be riveted together to make the loop. This avoids the chance of damage to the leads in the center passage 18. The end opening of passage 18 is preferably plugged, as with a silicone, to prevent water leakage into the passage.

At the other or head end, the leash has an eye or slider 35 through which the standing part (between the loops) passes, to form choker collar 13. The collar is self-tightening as the animal strains against it, but the width of the ribs 15 and 16 prevents the choker from becoming too constrictive. The ribs also facilitate joining the eye 35, which otherwise would be difficult to join to the smaller, thinner, and somewhat collapsible center portion 17.

Figure 4:
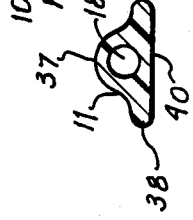
FIG. 4 is a section similar to FIG. 3 but shows an alternative cross-sectional shape for the leash.

In FIG. 4 an alternative cross-sectional shape is shown wherein the ribs 38 and 39 are not diametral. This configuration has a center portion 37 with a pair of ribs 38 and 39 which are coplanar along one surface to form a flat base 40.

Having described the invention, what is claimed is:

1. An illuminatable leash for a pet animal, said leash comprising,
    a flexible, transparent hollow tube having a central passage which extends longitudinally through it,
    said tube having two longitudinal ribs extending along opposite sides of a relatively thicker center portion between them, said passage being presented in said center portion,
    a series of small electric lights connected to insulated wires and disposed along said passage, said lights spaced apart along said passage,
    said tube having one end which is looped back and secured to itself, to form a hand-holdable loop,
    said tube extending through a slip eye at a second end thereof, to provide a choker-type collar, and
    a battery and a switch for selectively supplying power to said wires to illuminate said lights.

2. The leash of claim 1 wherein the width of said leash as measured across said ribs is substantially greater than the thickness of said center portion,
    said ribs being thinner than said center portion.

3. The leash of claim 1 wherein said battery and switch are mounted to said leash adjacent said hand-holdable loop.

4. The leash of claim 1 wherein fastening means extend through ribs in overlying position, to form said hand-holdable loop.

5. The leash of claim 1 wherein said passage is closed where said one end of said leash is secured to itself to form said loop, and wherein said passage is closed by said eye at said second end.

6. The leash of claim 1 wherein said wires and lights are not secured axially along said passage, except at one end thereof.

* * * * *